United States Patent [19]

Scholes

[11] Patent Number: 5,284,684
[45] Date of Patent: Feb. 8, 1994

[54] METHOD AND APPARATUS FOR COATING GLASSWARE

[75] Inventor: Addison B. Scholes, Muncie, Ind.

[73] Assignee: Alltrista Corporation, Muncie, Ind.

[21] Appl. No.: 845,098

[22] Filed: Mar. 3, 1992

[51] Int. Cl.$^5$ .............................................. B05D 1/02
[52] U.S. Cl. ................................... 427/469; 65/60.3;
118/624; 118/625; 118/630; 118/634; 427/422;
427/477; 427/483; 427/486
[58] Field of Search ............. 427/477, 469, 483, 486,
427/422; 118/624, 625, 630, 634; 65/60.3

[56] References Cited

U.S. PATENT DOCUMENTS

| Re. 24,602 | 2/1959 | Simmons | 117/93 |
|---|---|---|---|
| 2,685,536 | 8/1954 | Starkey et al. | 117/93 |
| 2,794,417 | 6/1957 | Starkey et al. | 118/51 |
| 2,893,893 | 7/1959 | Crouse | 117/93 |
| 2,893,894 | 7/1959 | Ransburg | 117/93 |
| 2,995,533 | 8/1961 | Parmer et al. | 260/23 |
| 3,048,498 | 8/1962 | Juvinall et al. | 117/93 |
| 3,169,882 | 2/1965 | Juvinall et al. | 117/93.4 |
| 3,169,883 | 2/1965 | Juvinall et al. | 117/93.42 |
| 3,323,934 | 6/1967 | Point | 117/17 |
| 3,386,855 | 6/1968 | Scholes | 117/124 |
| 3,487,035 | 12/1969 | Bogart | 260/23 |
| 3,712,829 | 1/1973 | Herman | 117/54 |
| 3,801,361 | 4/1974 | Kitaj | 117/124 E |
| 3,876,410 | 4/1975 | Scholes | 65/60 |
| 3,911,161 | 10/1975 | Nord et al. | 427/422 X |
| 3,989,004 | 11/1976 | Scholes | 118/48 |
| 3,991,710 | 11/1976 | Gourdine et al. | 118/634 |
| 3,997,693 | 12/1976 | Kircher | 427/384 |
| 4,009,301 | 2/1977 | Heckman et al. | 427/469 X |
| 4,039,310 | 8/1977 | Sipe et al. | 65/25 |
| 4,073,966 | 2/1978 | Scholes et al. | 427/26 |
| 4,130,407 | 12/1978 | Ida | 65/30 |
| 4,135,014 | 1/1979 | Salensky et al. | 428/35 |
| 4,170,193 | 10/1979 | Scholes et al. | 118/627 |
| 4,431,692 | 2/1984 | Hofmann et al. | 428/35 |
| 4,517,242 | 5/1985 | Sinha et al. | 428/336 |
| 4,517,243 | 5/1985 | Sinha et al. | 428/336 |
| 4,529,657 | 7/1985 | Franz | 428/410 |
| 4,615,916 | 10/1986 | Henderson | 427/255 |
| 4,719,126 | 1/1988 | Henery | 427/165 |
| 4,719,127 | 1/1988 | Greenberg | 427/165 |
| 4,812,332 | 3/1989 | Kerhere et al. | 427/168 |

*Primary Examiner*—Bernard Pianalto
*Attorney, Agent, or Firm*—Willian Brinks Hofer Gilson & Lione

[57] ABSTRACT

Electrostatic coating methods and apparatus are used to coat the exterior surface of glassware and preclude deposition on the interior surface and mouth of the glassware. A preferred stearic acid coating electrostatically applied over glassware with a hot end coating provides a more durable coating, improves scratch resistance and can reduce the amount of hot end coating for improved scratch resistance.

43 Claims, 8 Drawing Sheets

METHOD AND APPARATUS FOR COATING GLASSWARE

FIELD OF THE INVENTION

This invention relates to a method and apparatus for applying a new lubricious transparent coating on glassware, and relates to a method and apparatus for applying coating material to the exterior of open top glass containers while precluding the deposition of coating material onto interior surfaces of the containers where it may affect the taste of the containers' contents. More particularly, this invention relates to method and apparatus for applying a new, inexpensive, thin, lubricious, transparent glassware coating that remains tenacious, lubricious and protective after exposure to high temperatures and sterilization and does not deleteriously affect the taste of such fragile container contents as beer or the labeling of the glassware.

BACKGROUND OF THE INVENTION

Formation of durable lubricious coatings have been found to be of great importance in the glass container industry to provide glass articles, or ware, with at least one layer of an adhering lubricating material in order to facilitate high speed automatic handling of glass articles in production lines and to protect articles against contact abrasion damage and unsightly scuff and scratch marks. Uncoated glass articles are highly susceptible to abrasion damage, and it has been reported that newly formed uncoated glass articles can quickly lose up to 75% of their bursting strength due, at least in part, to surface abrasion caused by contact with other glass articles, as normally occurs during processing and handling of such articles.

While some coatings have been applied to articles just prior to use, to be fully effective, the articles must be coated soon after they are formed, and in the case of annealed articles, for example, such coatings have been applied immediately before and/or after annealing.

In practice, pre-annealing coatings, sometimes referred to as "hot end" coatings, are applied to glassware after it leaves the glassware machine in an initial coater. The initial coater forms a very thin metal oxide coating on the outer surface on the surface of the glassware, which is then carried to the annealing lehr. Commonly used metal oxides include tin compounds and titanium oxide. Such pre-annealing coating methods and apparatus are disclosed, for example, in U.S. Pat. Nos. 4,431,692; 4,615,916; 4,668,268; 4,719,126; and 4,719,127 and others listed below.

A number of post-annealing coatings, sometimes referred to as "cold end" coatings, and methods and apparatus for their application, have been disclosed, for example, in U.S. Pat. Nos. 2,995,633; 3,386,855; 3,487,035; 3,712,829; 3,801,361; 3,876,410; 3,989,004; 3,997,693; 4,039,310; 4,130,407; 4,135,014; 4,517,242; 4,517,243; 4,529,657; and 4,812,332.

Electrostatic deposition methods and apparatus are well known. Such methods and apparatus have been in common use in industry to apply various useful, protective and decorative coatings. Examples of such electrostatic coating methods and apparatus include U.S. Pat. Nos. 2,685,536; 2,794,417; 2,893,893; 2,893,894; Re. 24,602; 3,048,498; 3,169,882; 3,169,883; 3,323,934; 3,991,710; 4,073,966; 4,170,193 and many others. Notwithstanding their extensive development and use, electrostatic coating methods and apparatus have not been used in the application of cold end coating materials to glass containers.

U.S. Pat. Nos. 3,876,410 and 3,989,004 disclose the use of a coating material that is, at least in part, vaporizable at a readily obtainable temperature and capable of producing vapor that is contact-adherent to the article to be coated to produce a durable and tenacious, lubricious coating. In general, the patents disclose that an acceptable coating material can be formed from organic materials, particularly hydrocarbons formed from methylene, ethylene, propylene, butylene, fatty acids and their derivatives and the like, and that to be particularly effective, the vapor molecules of the coating material should be of a polar-non-polar nature such that the polar portion of the molecule will tend to adhere strongly to the article to be coated and oriented so that the non-polar portion of the molecule forms the lubricious external surface. A particularly useful group of such coating compositions disclosed in these patents are the saturated and unsaturated fatty acids containing between 10 and 18 carbon atoms. When used in the method of these patents, such coating materials are vaporized and conducted to the vicinity of newly formed glassware and readily adhere to the glassware in a thin, clear, tenacious, lubricious coating. To maintain the surface energy of the glassware at a high level, the glassware is maintained at a temperature between about 100° F. (37° C.) and 325° F. (162° C.) and preferably at a temperature between about 120° F. (49° C.) and 250° F. (121° C.).

Caporic acid, stearic acid, oleic acid, myristic acid, linolic acid and palmatoleic acid [sic]are disclosed as typical of the compositions yielding desirable coatings on glassware when used according to the method of the above patents.

Of the compositions disclosed in these patents, the preferred composition is oleic acid. Oleic acid is a bland liquid in normal condition having an appearance similar to that of cooking oil. It has been approved for use in connection with food products. As little as 1 drop of oleic acid every 17 seconds has been found sufficient to produce a superior lubricating coating on catsup bottles passing through the vapor at the rate of 80 bottles per minute Thus, 1 drop of oleic acid provides sufficient vapor to coat about 20 catsup bottles. Further, oleic acid is readily available in high-grade quality at low cost. Because of these advantages, oleic acid has been a primary coating material used to provide post-annealing (cold end) coatings.

Oleic acid, however, is liquid at temperatures in excess of 57° F. (14° C.). When glassware coated with oleic acid is exposed to elevated temperatures, such as in an autoclave for the sterilization of food containers, the oleic acid coating is substantially removed by the harsh and hot conditions, and the scratch resistance and lubricity are deleteriously affected, thereby increasing the risk of breakage. Breakage during processing is serious because of the possibility of slivers or fragments of the shattered glass being deposited in adjacent ware, which is undesirable in most situations and is completely unacceptable when the ware is to be used for food packaging.

It is also important that any coating material applied to glassware used with food or liquid products does not leave a residual taste of any sort in the food or liquid. Indeed, oleic acid is commonly known to impart a bad taste to the contents of the glassware, and is also known to adversely affect the foaming of carbonated beverages.

Among the above-identified patents, U.S. Pat. Nos. 4,039,310 and 4,130,407 disclose methods of strengthening glass against failure. U.S. Pat. No. 4,039,310 discloses a method of strengthening glass by heating the glass to a temperature in excess of 700° F. (371° C.) but below the decomposition temperature of a selected fatty acid, such as behenic, stearic or glutamoric acid and applying the fatty acid to the heated glass. U.S. Pat. No. 4,130,407 discloses a method of strengthening glass by applying a fatty acid derivative of an inorganic salt at temperatures between 100° C. (212° F.) and 500° C. (932° F.).

With conventional coating methods, coating material is often needlessly applied to the interior of the glassware. Existing methods and apparatus for coating glassware do not preclude the deposition of coating material to the interior of the glassware. In many applications of glassware this presents no problem, even with such cold end coatings as oleic acid. However, a serious problem exists with respect to glass bottles used to contain beer, carbonated soft drinks and other fragile food stuffs whose taste, foaming or other characteristics may be damaged by glassware coating materials. Not only can an interior coating often taint the taste of beverages stored in the bottle, but such coatings, if applied to the exterior of the mouth of the bottle, can frequently leave a residual taste in the mouth of a person drinking directly from the bottle, which is common in the use of beer or soft drink bottles.

A need exists in the manufacture of coated glass containers to coat the containers to provide an inexpensive, thin, tenacious and protective coating without affecting important desirable attributes of the containers' contents, such as taste, foaming and the like.

DISCLOSURE OF THE INVENTION

This invention provides a new method and apparatus for providing glassware containers with a new, lubricious and protective coating that does not interfere with the taste and other desirable characteristics of beverages and other food stuff contents. Preferred coatings of the invention are also non-toxic and tenacious, retain their lubricity and protective qualities after exposure to the high temperatures and harsh conditions of sterilization, remain transparent, do not interfere with labeling and can reduce the cost and amount of hot end coating. This invention provides such coatings electrostatically substantially entirely onto the exterior of a container and can preclude the deposition of coating material onto the interior of the container and the exterior of the mouth of an open top container.

Apparatus of the invention comprises means for providing a plurality of hot glass containers each having an open top, means forming a coating zone adapted to receive the glass containers to be coated, means for carrying the glass containers in an upright position through the coating chamber, means for generating an electrostatic charging and depositing field within the coating zone, and means for dispersing coating material particles within the coating zone for charging and deposition substantially entirely on the exterior surface of the glass containers.

In the method of the invention, a plurality of glass containers is carried, while still hot, through a coating zone preferably by a grounded conveyor. An electrostatic charging and depositing field is generated in the coating zone that terminates substantially entirely on the exterior surface of the glass containers. Coating material in the form of fine liquid particles is introduced into the coating zone and is electrostatically charged and deposited substantially entirely onto the exterior of the containers and generally below their open tops. In methods and apparatus of the invention, application of coating material is precluded from the glassware surface where it is unwanted by deposition substantially entirely by electrostatic forces.

In preferred methods of the invention, the glass container coating is preferably stearic acid. The stearic acid coating material is liquified and preferably atomized into micron-sized particles using preferably a flow of gas, which can be an inert gas or air. The micron-sized stearic acid particles are introduced adjacent to hot glassware containers to be coated for deposition on the glassware surface. An electrostatic charging and depositing field is created in the coating zone, preferably by a high voltage electrode, which also charges the stearic acid particles. In the invention, the electrostatic depositing terminates substantially entirely on the external surface of the hot glassware container, which is maintained at a particle-attracting potential by a grounded support, or a metal mesh belt conveyor. With this invention any deposition of stearic acid coating material to the mouth and interior of the glassware containers is so small as to be undetectable and non-deleterious, even if the containers are used for beverages such as beer.

Deposition of coating material can be further precluded from the mouth and neck of the glassware containers by cooling the top and/or neck region of the glassware containers prior to their entry into the coating zone. The hot portion of the glassware container is generally sufficiently electrically conductive to continue to attract the charged coating material particles as the containers pass through the charged coating material particles, but cooling the upper portion of the glassware container adjacent its open top decreases the electrical conductivity of the glassware in this portion to the point where the upper portion becomes insulative, i.e., sufficiently non-conductive to fail to attract the charged coating material particles in the coating zone.

In preferred methods and apparatus of the invention a quiescent cloud of coating material particles can be generated by an atomizer coupled to the coating zone. The atomizer is connected to a liquid supply of heated coating material and employs a flow of atomizing gas to direct a gentle flow of fine coating material particles to the coating zone. The containers, heated to approximately 300° to 400° F. (149°–204° C.), are preferably carried through a coating chamber in a plurality of files, and the coating material particle cloud is introduced within the coating chamber at a plurality of dispersion points located between the files of containers and generally below the open tops of the containers. The electrostatic charging means located preferably adjacent the points of dispersion of the coating material, charge the coating material particles for electrostatic deposition onto the exterior of the containers.

The electrostatic charging means employed by this invention preferably includes a small plurality of separate needle electrodes separated by distance great enough to insure an ionizing electrostatic field gradient at their ends. Such electrodes can surround each dispersion orifice. In some preferred apparatus embodiments a single needle electrode can be disposed adjacent each dispersion orifice. In other embodiments, a plurality of wire electrodes can be arranged within the coating chamber separated by an effective electrostatic separation distance and oscillated in a cloud of fine coating material particles dispersed from stationary locations. In still other embodiments one or more wire electrodes may be located in the coating zone to establish an electrostatic charging and depositing field.

Further features of this invention will be apparent from the following drawings and description of the invention.

DESCRIPTION OF THE BEST MODE OF THE INVENTION

Figure 1:
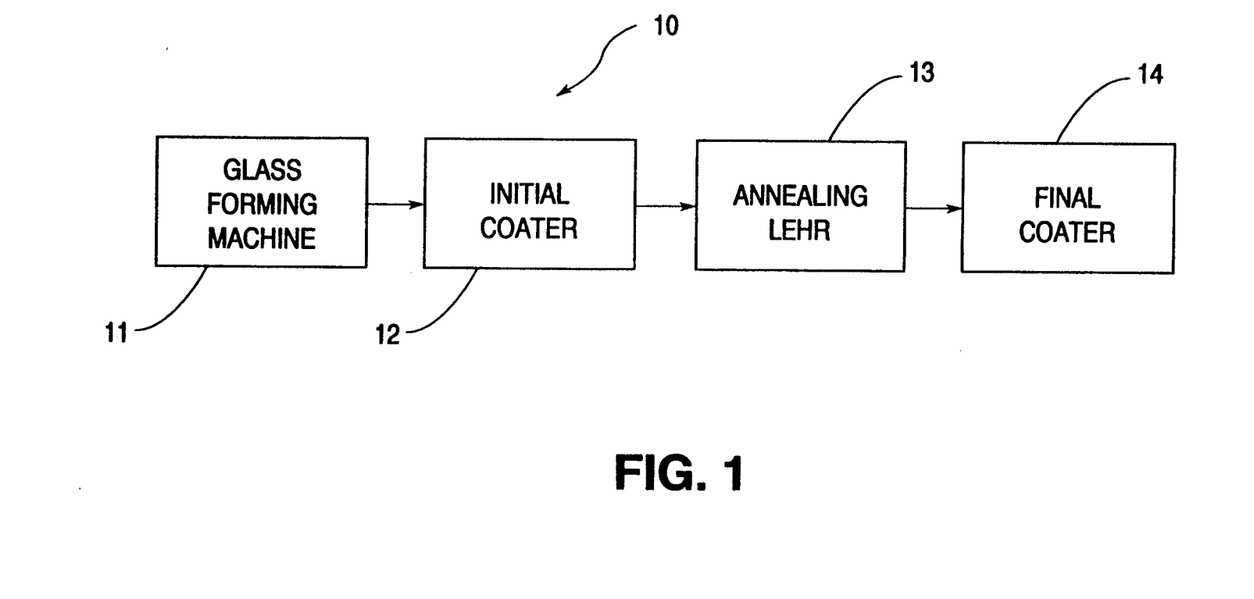
FIG. 1 is a single block diagram of a glassware manufacturing system with a dual coating application.

FIG. 1 illustrates a glassware manufacturing system 10 including a glassware forming machine 11 (such as an Individual Section (IS) Machine), an initial, or pre-annealing, coater 12, an annealing kiln 13 and a final coater 14. The glassware manufacturing system 10 forms a dual coating on the formed glassware with a pre-annealing, or "hot end" coating formed in the initial coater 11 and a post-annealing, or "cold end" coating formed in the final coater 14.

When dual coatings are formed on glass articles, a metallic oxide coating is first formed on the surface of the articles, and this coating is preferably formed substantially immediately after the articles are formed and before the articles are annealed. This coating may be formed on the articles in a know manner and preferably is formed by exposing the articles to the vapor of a heat decomposable metallic compound while the articles are heated to a temperature above the decomposition point of the compound. Excellent results have been achieved by coating articles, substantially immediately after their forcing, by means of the vapor of a tin compound and while the articles retain sufficient heat of formation to be still at a temperature above the decomposition point of the compound to thereby form a tin oxide coating on the surface of the article by chemical reaction between the vapor and the heated glass surface. In addition, titanium may be utilized, if desired, to form a titanium dioxide coating on the surface of the article in the same general manner.

Suitable metallic compounds may be either organic or inorganic in nature, and may be, for example, an inorganic salt such as a metallic halide or an organic metallic compound such as alkyl aryl tin or isopropyl titanate, etc. Tin compound such as stannous chloride, stannic chloride, stannous fluoride, diethyl isobutyl tin, di-isopropyl tin dibromide, etc., have been found to be particularly useful in forming the tin oxide coating on the glass article. Titanium compounds such as titanium tetrachloride or tetra-isopropyl titanate likewise have been found to be particularly useful in forming a titanium dioxide coating on the glass article.

The oxide coating formed on the articles is very thin and advantageously is less than about one-fourth wavelength of visible light in thickness. As a result, the film is invisible to the eye and does not significantly change the appearance of the articles.

This invention provides a new coating that is preferably applied at the "cold end" of the glassware manufacturing system, but that may also be used separately from a glassware manufacturing system.

Figure 2:
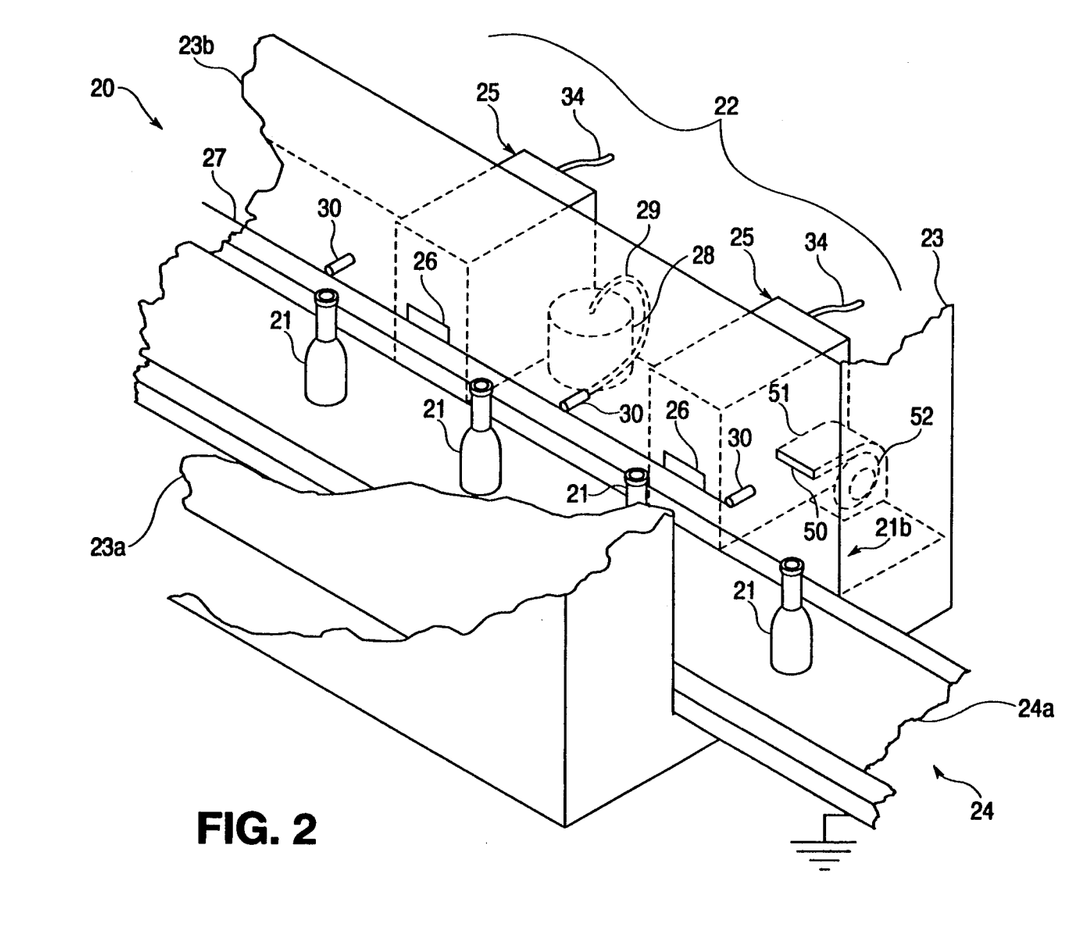
FIG. 2 is a partially broken away perspective view of an embodiment of this invention.
Figure 3:
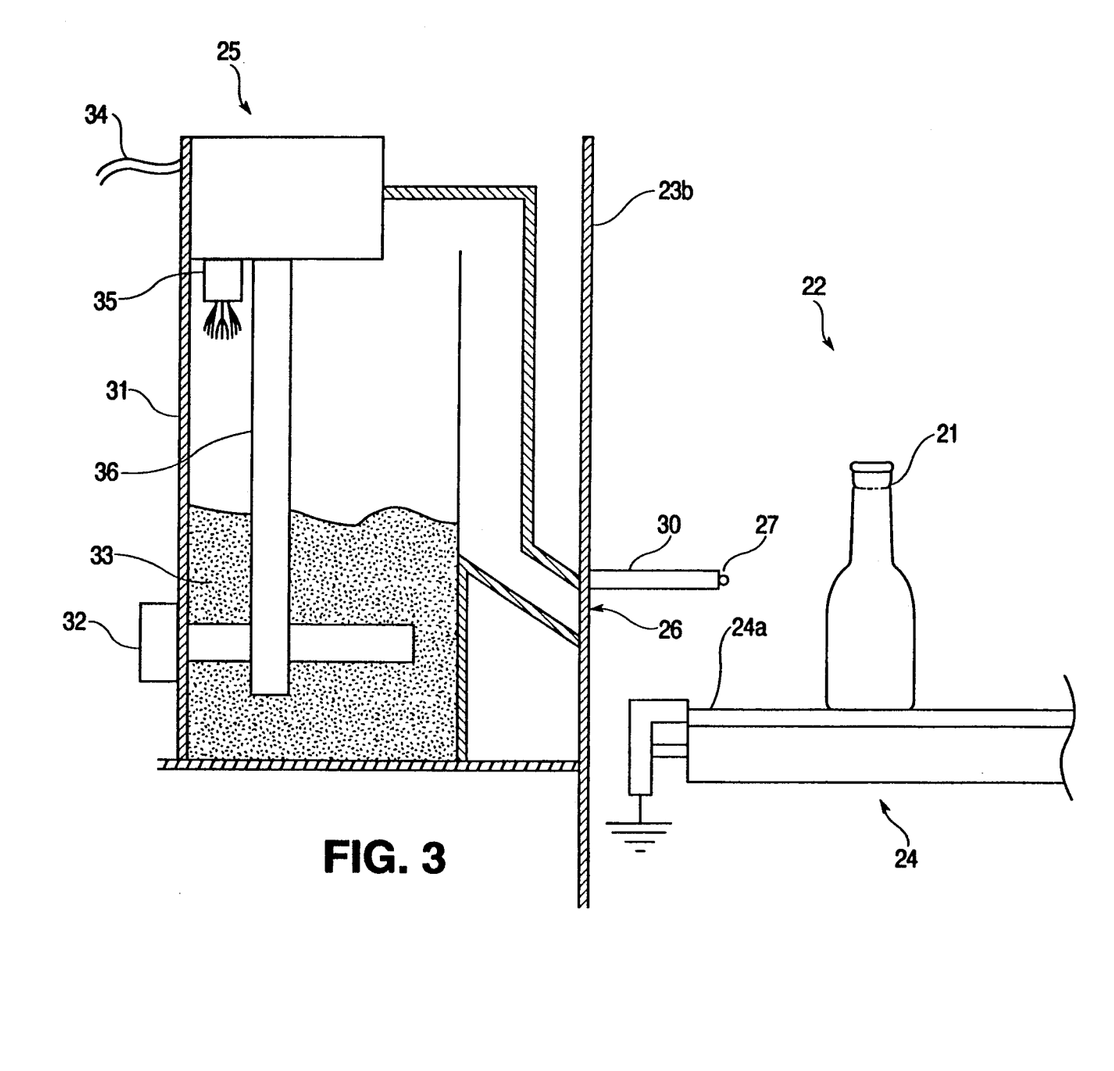
FIG. 3 is a cross-section, through one of the means for providing coating material particles, of the embodiment of FIG. 2 to further illustrate the invention.

FIG. 2 is a partial and broken away illustrating of a method and apparatus 20 of this invention. In this invention, coatings are applied to the exterior of a plurality of bottles 21 in a coating zone 22. The coating zone 22 can be defined by a means 23 for forming the coating zone 22 as either partially or substantially totally enclosed. As shown in FIG. 3, the means 23 forming the coating zone 22 is left open at the top and the coating zone 22 is enclosed within and formed by sides 23a and 23b of means 23 and the conveyor 24. Because, as described below, the coating material within the coating zone 22 comprises a substantially quiescent cloud of coating material particles, a total enclosure of the coating zone is unnecessary. Coating zone 22 is most generally formed by a means 23 formed from sheet metal, but it may be advantageous in some installations to define the coating zone with walls, such as walls 23a and 23b of FIG. 2, formed of electrically non-conductive material such as polypropylene, nylon, polyethylene and the like, or metallic walls, such as 23a and 23b, may be covered with such non-conductive materials.

Coatings of this invention may be applied as the final coating of a glassware manufacturing operation as shown in FIG. 1, and the apparatus of FIG. 2 may be substituted for the prior ar final coaters of FIG. 1. In such installations, the glassware containers 21 leave the annealing lehr 13 while still hot and are carried by the conveyor 24 through the coating zone 22 for application of a cold end coating of this invention. In such applications of the invention, the glassware or bottles 21 enter the coating zone 22 at a temperature generally in excess of 250° F. (121° C.) and preferably in the range of 250° to 300° F. (121° to 149° C.). Particles of coating material are introduced into the coating zone 22 by a plurality of sources 25 of coating material particles. The coating material sources 25 atomize the coating material into fine liquid particles in a manner described below, and direct the fine liquid particles of coating material into the coating zone 22 through openings 26 in the side wall 23b of means 23. The sources 25 of coating material provide a quiescent cloud of coating material particles in the coating zone 22 adjacent the containers 21. In a manner more fully described below, an electrostatic charging and depositing field is established between a high voltage electrode 27 and the exterior surfaces of the glassware 21. Conveyor 24, and the moving belt 24a of conveyor 24 that carries the plurality of glassware containers 21 through the coating zone 22, are maintained at substantially ground potential. The hot glassware 21 has a sufficient electrical conductivity that its surface does not accumulate an electrostatic charge sufficient to repel the coating material particles, that is, the exterior surface of the glassware is maintained at a particle attracting potential because of its temperature and its contact with the grounded conveyor 24. The coating material is electrostatically deposited substantially entirely on only the exterior surfaces of the glassware 21 while it is in the coating zone 22.

The charging and depositing electrode 27 is, as shown in FIGS. 2 and 3, a fine wire having, for example, a diameter of about 0.010 inches (0.025 cm.) that is connected with a source of high voltage 28 by a high voltage cable 29. The charging electrode 27 is supported, as shown in FIGS. 2 and 3 by the side wall 23b and a plurality of standoff insulators 30. As well known in the art, such standoff insulators may be nylon rods having a length in excess of the sparking distance between the electrode 27 and the side wall 23b. In addition, the standoff insulators 30 may be sections of polyethylene rod, polypropylene rod, methyl methacrylate rod or may be made of other such good insulating materials. Where, for example, the electrode voltage is on the order of 30–60 kilovolts d.c., the insulators 30 may have a length on the order of 3–6 inches (7.6–15.2 cm).

FIG. 3 is a partial cross-sectional view looking from the left of FIG. 2 at a plane through the central portion of one of the sources of coating material particles 25. As shown in FIG. 3, the glassware 21 is carried out of the plane of the paper toward the reader on the conveyor belt 24a of conveyor 24. The source 25 of coating material delivers coating material particles 25 to the coating zone 22 through the opening 26 shown in cross-section in FIG. 3. The source of coating material 25 comprises a closed container 31 including an immersion heater 32 to maintain a pool of liquified coating material 33 within the container 31. A flow of compressed air is delivered to the source 25 through a hose 34. The flow of compressed air is directed within source 25 to the air orifice of a compressed air atomizer 35. In a manner well known in the atomizer art; the compressed air atomizer 35 includes a liquid orifice adjacent the air orifice, and the liquid orifice is connected with the pool or coating material 33 through a long tube 36 extending below the surface of the coating material pool. The flow of air through the air orifice of atomizer 35 draws liquid coating material from the pool 33 to the liquid orifice of the atomizer 35 and the coating material is atomized into liquid coating material particles within the container 31 by atomizer 35.

Within container 31, the larger liquid particles return to the pool 33 of coating material and the very fine micron-size particles are carried from the chamber 31 with the atomizing air as it escapes from container 31 through orifice 26. In such embodiments of the invention, the fine particles of coating material are delivered to the coating zone 22 as a quiescent cloud of microsphere particles. As is indicated in FIG. 3, the quiescent cloud of coating material particles is exposed in the coating zone 22 to the electrostatic charging and depositing field established by electrode 27 which is connected with high voltage source 28. While the charging electrode 27 shown in FIGS. 2 and 3 is, for example, a fine steel wire having a diameter on the order of 0.010 inches (0.025 cm.) extending along and through the coating zone 22, the electrode 27 can, as described below, have other configurations. In the invention, the electrode used only one charged to a voltage which, with its "electrically sharp" configuration, will provide a corona current in excess of several microamperes. The exact voltage and current necessary for effective charging and deposition of the coating materials depends upon the shape and location of the electrode and its relationship to the coating material particles to be charged and deposited. Where, as shown in FIGS. 2 and 3, the charging electrode is a long wire extending along the coating zone 22, the total d.c. current flow from the wire may be as high as 100 to 200 microamperes and the high voltage to which the electrode 27 is charged may be as high as 50 kilovolts. As indicated in FIG. 3, the electrode 27 is supported adjacent the openings 26 from which the coating material particles enter the coating zone. In addition, the charging electrode 27 is located at the level of the central portion of the glassware 21 to be coated.

Figure 4:
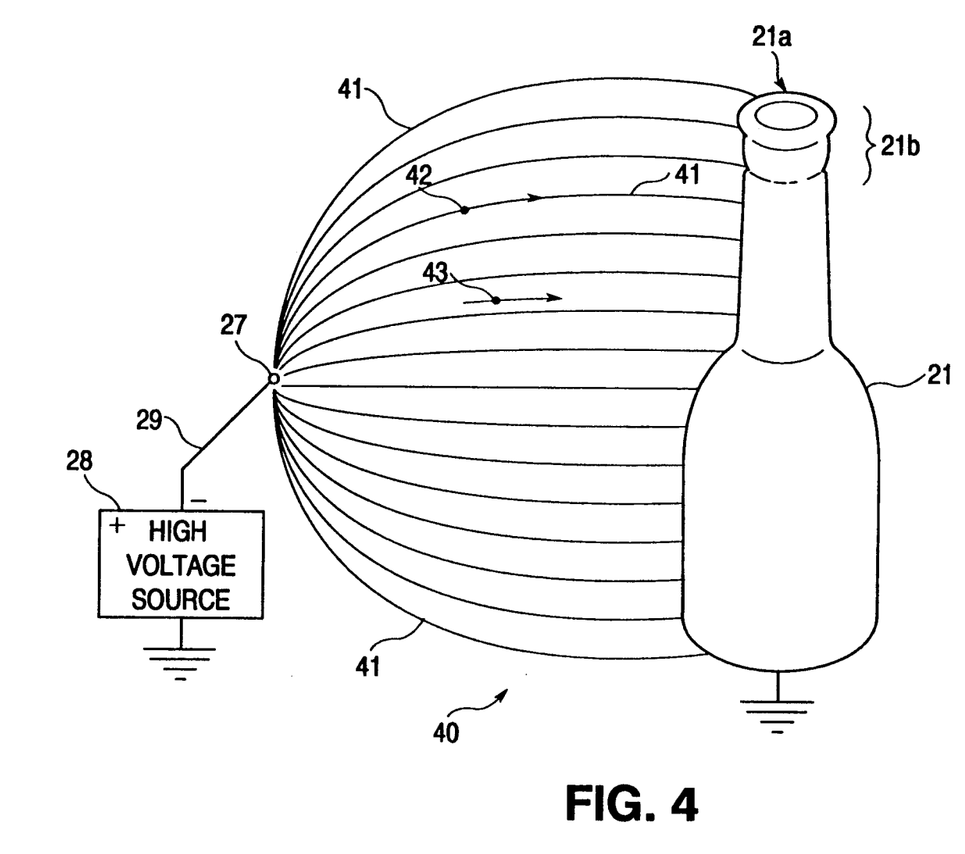
FIG. 4 is a diagrammatic representation of an electrostatic charging and depositing field to help explain the invention.

FIG. 4 is a pictorial representation of an electrostatic charging and depositing field of the invention and, more particularly, an approximation, for the purposes of description of the invention of lines of force of an electrostatic depositing field of the type established in the apparatus and method of FIGS. 2 and 3.

Referring now to FIG. 4, because the glassware 21, shown here as a long neck beer bottle, is heated to a temperature on the order of 250° to 300° F. (121° to 149° C.), the electrical conductivity of the glass which makes up the glassware 21 is low enough to dissipate the small electric charge carried by charged coating particles to the glassware 211. In the commonly accepted theories of electrostatics, an electrostatic field 40 may be considered as comprised of many "lines of electrostatic force" 41 that extend from a charged electrode, like electrode 27 connected to a high voltage source 28, to the external surface of other electrodes, such as the glassware 21. Although the lines of electrostatic force 41 of the electrostatic field 40 are shown in FIG. 4 as terminating only at the left side of the glassware bottle 21, it must be understood that the electrostatic field 40 extends to all external surfaces of the glassware 21 including those at the right of FIG. 4. The FIG. 4 illustration is included here only to help in understanding the electrostatic deposition aspects of the invention. An actual depiction of the forces created in any electrostatic field is not possible with any real accuracy, and the lines of electrostatic force 41 in FIG. 1 are intended to depict those lying in only a single plane passing from the electrode 27 through the glassware 21.

As indicated in FIG. 4, electrode 27 is charged to a high negative voltage with respect to ground and the hot glassware 21 is in contact with a grounded support at its base and may thus be maintained at a particle-attracting potential in the electrostatic field 40. Coating material particles, such as those indicated by the numerals 42, 43, that are present in the electrostatic field 40 will become charged by bombardment with electrons and ions created by the intense electrostatic field adjacent charging electrode 27. The negative particles in the ionizing field adjacent electrode 27 are repelled and bombard the coating material particles of the quiescent cloud in the coating zone, and the charged coating material particles are urged by electrostatic forces to follow the lines of force of the electrostatic field and are thus urged onto the exterior surface of the glassware 21 where they form a coating. Thus, as indicated in FIG. 4, coating material particles 42, 43 will obtain a negative charge and travel in paths generally parallel to the lines of force 41 until they contact and coalesce to the exterior surface of the bottle 21. Because substantially the 
only forces urging deposition of coating material onto the glassware 21 are electrostatic forces, the resulting coating on the glassware 21 is limited substantially entirely to the external surfaces. As is well understood in electrostatic theory, the electrostatic field 40 will not extend within the interior of the glassware 21. Because of the principle generally referred to as Faraday's Cage, no electrostatic line of force 41 originating from charging electrode 27 will terminate within the mouth 21a of the glassware 21.

While the deposition of coating material is limited to substantially entirely the exterior surface of glassware containers 21 by the electrostatic deposition methods and apparatus of this invention, deposition of a coating material on the top portion, the mouth and interior surfaces of the glassware container 21 can be even further precluded and prevented by cooling the top portion 21b of the glassware container before it enters the coating zone 22. This further method can be practiced by providing, at the entry of the coating zone, a flow of cooling air directed at only the upper portion of the glassware containers. As shown in FIG. 2, such cooling can be accomplished by providing an opening 50 in the side all 23b at the level of the top portion 21b of the glassware 21. The opening 50 is connected through a ductwork 51 with a blower 52. Such a blower need only provide a concentrated air flow of several hundred feet per minute directed from opening 50 at the top portion 21b of the glassware 21 to locally cool the top portion 21b of the glassware to the point where the glass making up the top portion 21b of glassware containers 21 resumes its substantially electrically non-conductive or insulative character, for example at temperatures on the order of 100° F. (38° C.).

Figure 5:
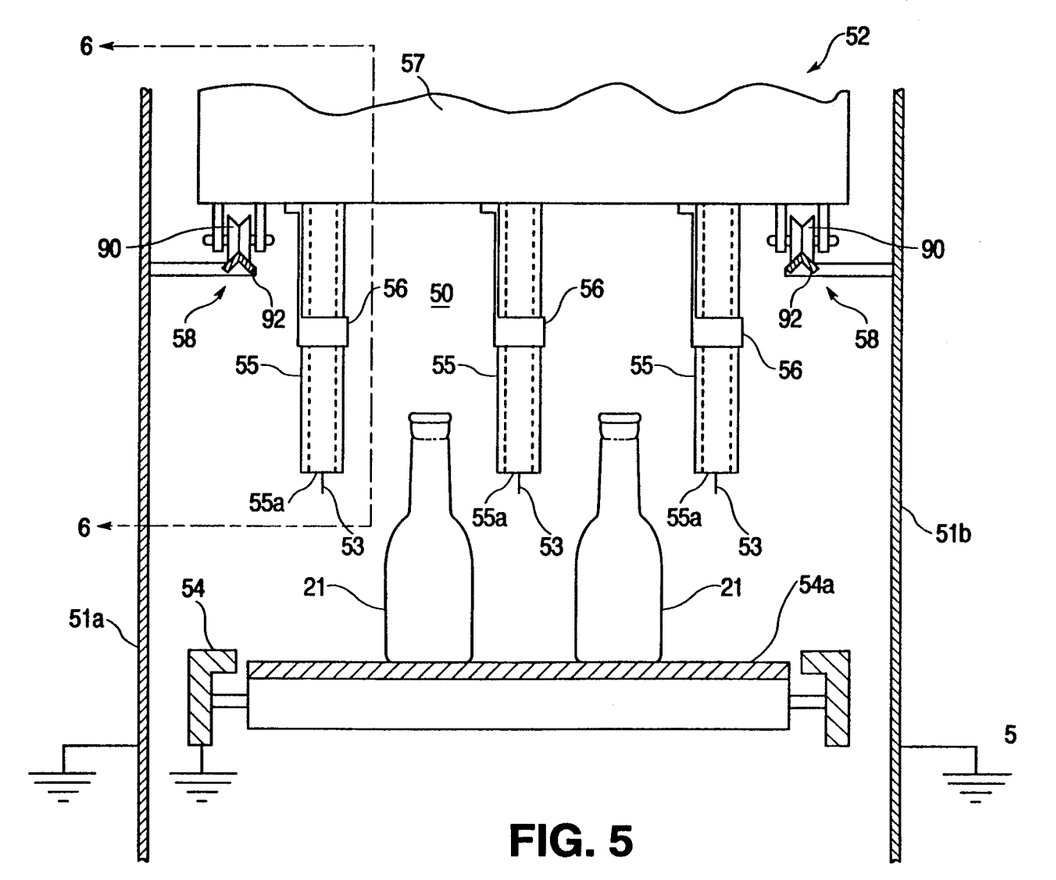
FIG. 5 is a cross-sectional view of another embodiment of the invention.

FIGS. 5-8 show other embodiments of the invention. FIG. 5 shows another embodiment 50 of the invention in which the glassware containers 21 are carried through a coating zone in a plurality of files. FIG. 5 is a drawing of an apparatus of the invention at a plane through the means forming the coating zone 51 upstream of the bottles 21 and means 52 for providing electrostatically charged coating material particles to the coating zone 50. The means 52 for providing a supply of charged coating material particles to the coating zone may be supported in such a manner that it is stationary in the coating zone, or, as indicated in FIG. 5 and described more fully below, oscillated or reciprocated within the coating zone.

Figure 6:
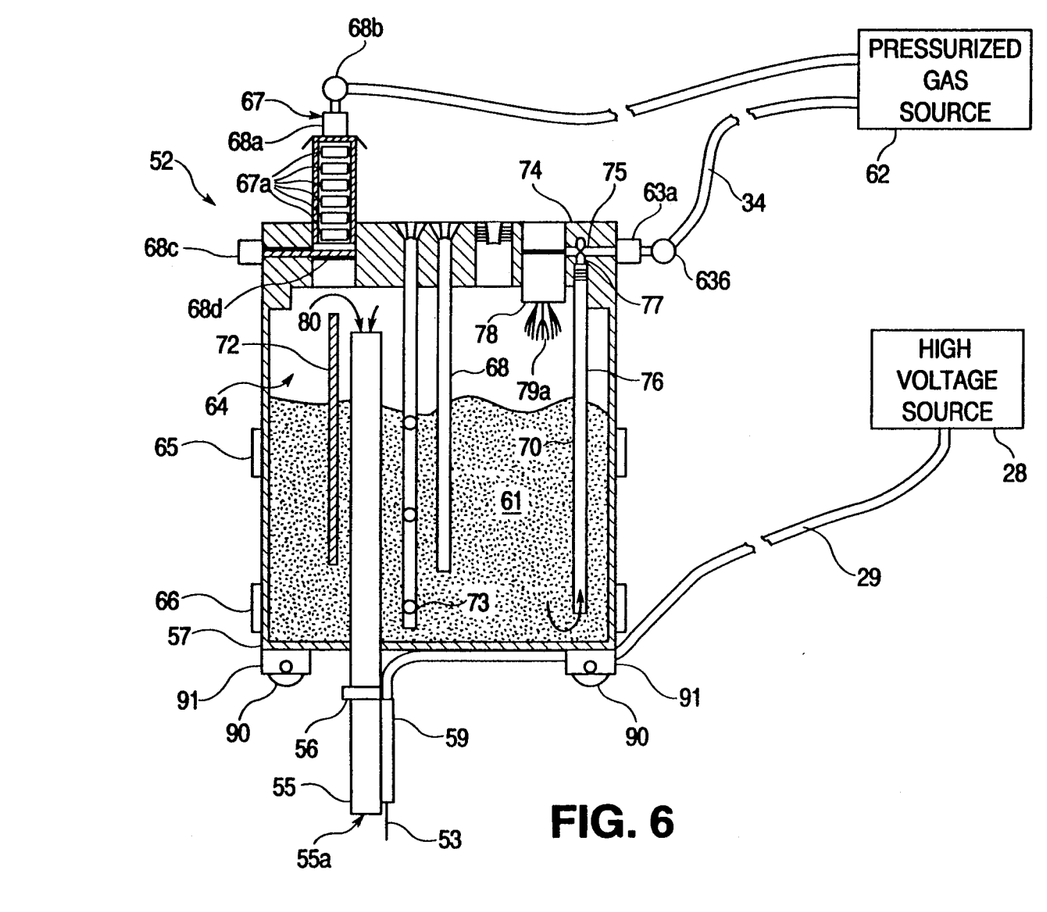
FIG. 6 is a cross-section at plane 6—6 of FIG. 5 through the means for providing charged coating material particles.

As shown in FIG. 5, a plurality of glassware containers 21, such as beer bottles, are carried through the coating zone 50 by a grounded conveyor 54 and grounded conveyor belt 54a. The glassware 21 is carried by the conveyor 54a in two files, as shown in FIG. 5, into and out of the plane of the paper. As shown in FIG. 5, the coating zone 50 is partially enclosed by walls 51a and 51b of means for forming a coating zone 50, conveyor 54 and, in part, by the means 52 for providing a supply of charged coating material particles to the coating chamber 50. As shown in Figs. 5 and 6, means 52 is adapted to be mounted above the glassware container 21 as it is carried through the coating zone on the conveyor 54. Means 52 is shown in greater detail in FIG. 6.

The embodiment of means 52, shown in FIGS. 5 and 6, comprises three particle distributors 55 that extend downwardly from the means 52 into the coating zone on both sides of and between the two files of containers 21. In the embodiments of FIGS. 5 and 6, the particle distributors 55 are electrically non-conductive tubes extending downwardly to provide particle-emitting orifices 55a at a level below the top portions 21b of the glassware 21. The particle distributors 55 are preferably formed of such electrically non-conductive tubular material as tubes made from ceramics, fiberglass reinforced epoxy, methyl methacrylate, nylon, polypropylene, or other such materials having little or no electrical conductivity in the presence of high voltage fields.

Figure 7:
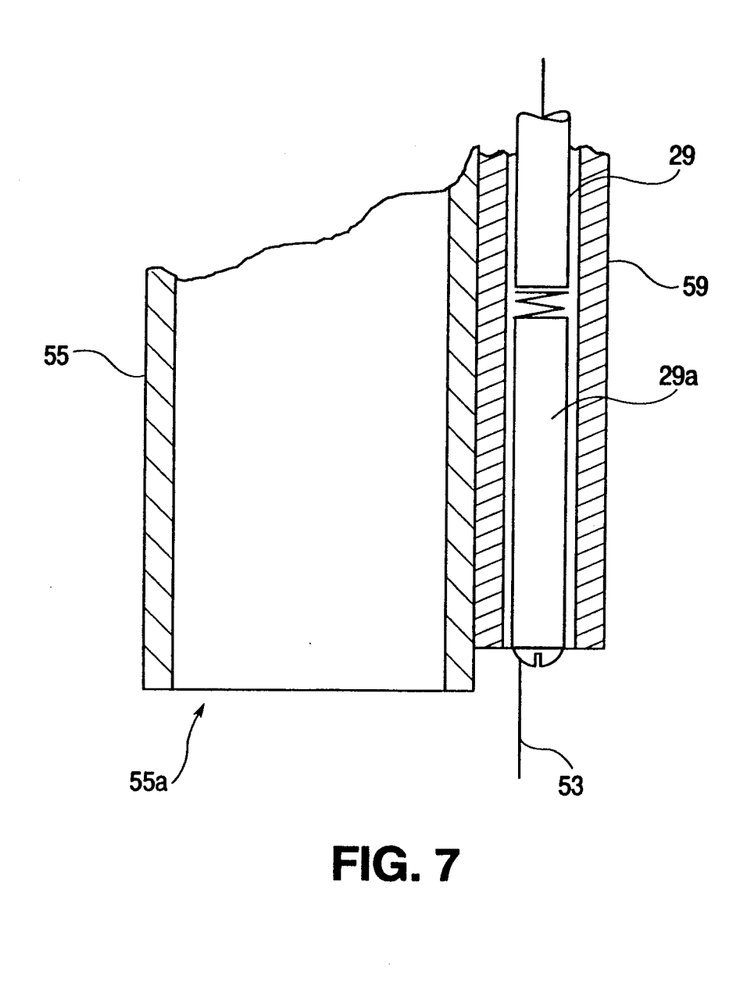
FIG. 7 is a cross-sectional view through the center of one embodiment of an electrostatic charging means that may be used in the invention.
Figure 8:
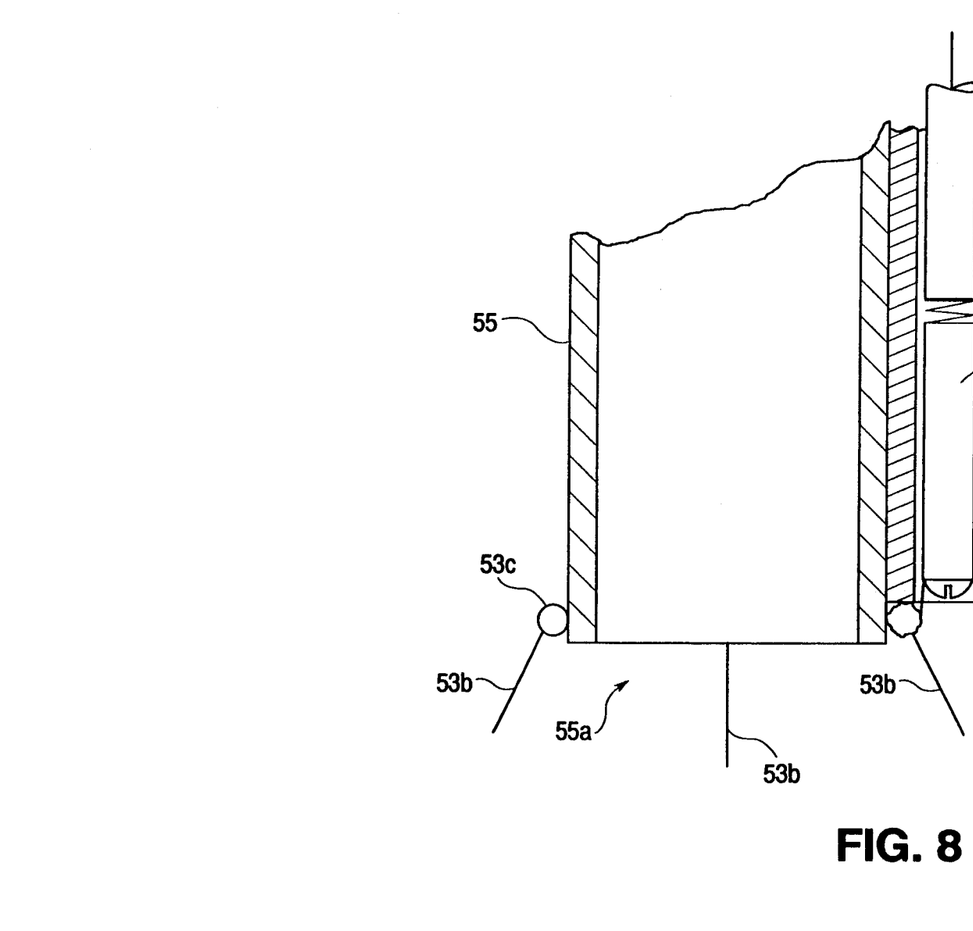
FIG. 8 is a cross-sectional view through the center of another embodiment of an electrostatic charging means that may be used in the invention.

As shown in FIGS. 5 and 6, a plurality of electrodes 53 are carried within the coating zone 50 by the means 52. In the embodiment shown in FIGS. 5 and 6, each of the charging electrodes 53 is a short length of small diameter wire having a diameter, for example, as small as 0.010 inches (0.025 cm.). The electrodes 53 are connected to a source 28 of high voltage as indicated in FIG. 6. Each of the electrodes 53 creates an intense electrostatic field immediately adjacent the particle distributing orifice 55a of one of the particle distributors 55. Because of the small diameter and pointed nature of the electrodes 53, each electrode creates an intense zone of ionization immediately adjacent the particle distributing orifice 55a and coating material particles distributed from the orifice 55a are forced to travel through the intense zone of ionization created adjacent the electrodes 53 where they become highly charged and result in a highly charged, substantially quiescent cloud of coating material particles in the coating zone 50 generally below the top portion of the glassware 21. The quiescent cloud of highly charged particles create an electrostatic depositing field to the exterior surfaces of the glassware containers 21, and an electrostatic depositing field is also created between the charging electrodes 53 and the exterior surfaces of the glassware 21. As a result, the charged particles of coating material are urged to travel to the exterior surfaces of the glassware 21 for deposition thereon substantially entirely by electrostatic forces.

Although not a necessary part of the invention, means 52 can include a metal ring, or a metal sleeve, 56 which is carried by the outer container portion of means 57. As shown in FIG. 5, such optional rings are grounded through the grounded container portion 57 of means 52 by the support means 58, which is carried by the grounded side walls 51*a*, 51*b* of the apparatus. The grounded rings 56 can be located at a select distance from the electrodes 53 to establish electrostatic lines of force between the electrode 53 and the rings 56 enhancing the intensity of the electrostatic field created adjacent the electrodes 53 and the particle charging of the electrodes. Such effects are described more fully in U.S. Pat. No. 3,169,882. In preferred embodiments of such apparatus, grounded electric heaters can additionally serve this purpose.

FIG. 6 shows a partial cross-sectional view of means 52 taken at a plane 6—6 of FIG. 5 through means 52 to show its structure and operation. As demonstrated by FIG. 6, the electrode 53 is connected to high voltage cable 29 leading to high voltage source 28 within a tube 59 of electrically non-conductive material. Tube 59 provides electrical isolation of the connection between the high voltage cable 29 and the electrode 53, and may additionally carry a high megohm resistor for increased safety as more fully described below. Tube 59 may be constructed of ceramic material, fiber reinforced epoxy, methyl methacrylate, polypropylene, nylon or other such materials of the kind which also make up the particle distributor 55.

FIG. 7 shows one preferred embodiment of means 53 for providing a charging and depositing field FIG. 7 is a cross-sectional view taken at a plane through the center axis of the forward most portion of a particle distributing tube 55 and the electrical insulating tube 59 of the electrostatic charging means. As shown in FIG. 7, the tube 59 isolating the connection between the high voltage cable 29 and the charging electrode 53 can encompass and carry a high megohm resistor whose resistance is dependent upon the size of the charging electrode 53 and the voltage of the high voltage source applied by cable 29. Where the charging electrode 53 is a small fine diameter wire, for example, a wire having a diameter on the order of 0.010 inches (0.025 cm.) and a length in the range of ¼ to ¾ inch (0.64 to 1.9 cm.), and the voltage applied by the high voltage cables on the order of 50–60 kilovolts, a resistance on the order of 100–200 megohms can substantially decrease the energy of a disruptive discharge or spark that may be obtained from the charging electrode 53 without interfering with its high ionizing capability and effective charging of the particles leaving particle-emitting orifice 55*a*. The coordination of charging electrode size and the high electrical resistance of electrode 53 can be determined in accordance with the teachings of U.S. Pat. No. 3,048,498.

FIG. 8 shows another embodiment of a charging electrode usable with the invention. As shown in FIG. 8, an alternative embodiment 53*a* of a charging electrode can comprise a plurality of elongated wire-like electrodes or steel needles 53*b* in a circular array around the particle-emitting orifice 55*a*. The embodiment 53*a*, as shown in FIG. 8, includes four pointed electrodes 53*b*, each of the pointed electrodes 53*b* being comprised, for example, of a steel needle having a diameter of 0.010 inches (0.025 cm.) and a length on the order of ¾ to 1 inch (1.9 to 2.5 cm.). Each of the needle-like electrodes 53*b* can be soldered to and supported by an electrode ring 53*c* supported by the particle distributor 55 in a position surrounding the particle-emitting orifice 55*a*. As shown in FIG. 8, the electrode supporting ring 53 can be connected to a high megohm resistor 29*a* with a high voltage cable 29. Because of the greater size of the electrode embodiment 53*a*, including a plurality of needle-like electrodes 53*b* and a supporting ring 53*c*, the resistance of the high megohm resistor 29*a* should be substantially higher than that used with the embodiment of FIG. 7 to provide comparable energy in a disruptive electrical discharge or spark that may occur from the electrode embodiment 53*a*.

Where a plurality of electrodes 53*b* are used adjacent a single particle emitting orifice or in proximity one to the other, each of the charged electrodes 53*b* should be located a sufficient distance from the other charged electrodes 53*b* to avoid the electrodes from mutually shielding each other and from diluting the concentration of the electrostatic field adjacent each electrode. Thus, each electrode 53*b* should be separated by an effective electrostatic distance from the adjoining electrodes 53*b*. For example, where the electrodes 53*b* are wire-like electrodes having a diameter of about 0.010 inches (0.025 cm.) an effective electrostatic separation would be a distance on the order of 1 to 2 inches (2.5 to 5.1 cm.).

In the practice of the invention, the coating zone may be provided with a plurality of particle charging and distributing means, such as means 52, which are stationary and located along the path of the conveyor 54. That is, means 52 may be mounted above the coating zone at a plurality of stationary locations located along the coating zone in a manner much like the coating material particle sources 25 are spaced along with coating zone 22 in FIG. 2.

However, in a preferred method and apparatus, the means 52 may be oscillated or reciprocated throughout the coating zone so that the particle distributors 55 will emit and distribute their particles back and forth through the coating zone, and the charging electrodes 53 will reciprocate back and forth through the quiescent charged coating material particles distributed into the coating zone by the reciprocating means 52. Thus, in the apparatus shown in FIGS. 5 and 6, means 52 are supported within the coating zone by a wheeled carriage that may include grooved wheels 90 mounted on axles which are journaled between axle supports 91 so that the means 52 may be rolled back and forth on conveyor tracks 92, which are supported by a supporting structure including walls 51*a* and 51*b* on each side of the coating zone. In such an apparatus, the conveyor tracks 92 for the means 52 may be located above the coating zone and extend along the entire length of the coating zone. The means 52 can be movably supported by wheels 90 on the conveyor tracks above the coating zone as shown in FIG. 5 and connected with a reciprocating apparatus which may be an air or hydraulic reciprocator, endless chain or any other such known means of obtaining reciprocating motion in such industrial apparatus. In addition, means can be provided to reciprocate such means 52 back and forth across the conveyor as it is moved down the conveyor keeping pace with the moving glassware, as is well known in the industrial spraying art.

FIG. 6 shows the interior portion of a means 52 which is adapted to provide coating material particles from a material which is solid at room temperature. Means 52 provides a source of liquified coating material 61 and micron-sized liquid particles of coating material with a flow of compressed gas. The source of compressed gas 62 is preferably a dried and regulated source of compressed factory air. The controlled and regulated gas source 62 is connected with means 52 through a solenoid actuated control valve 63*a* and a further pressure regulator 63*b*.

As shown in FIG. 6, means 52 comprises a structure 57 forming a closed container 64 which may be provided with heating means including a pair of band heaters 65, 66 and with means 67 to provide the closed container with a quantity of solid coating material pellets 67*a*. The closed container 64 is provided with a regulated flow of compressed gas through control valve 63. Container 64 may be maintained at a temperature above the melting point of a coating material but below its degradation temperature by a temperature sensor 68 that is connected with a system control (not shown). The system control can include electrical relays or contactors to control the flow of electric current through band heaters 65, 66 in response to the output of the temperature sensor 68, and to control thereby the temperature of the coating material 61 within means 52 in a manner well known in the art. The pellets of coating material 67*a* are introduced into the container 64 as needed, by the application of a regulated pressurized gas controlled by control valve 68*a* and pressure regulator 68*b* and by operation of a solenoid 68*c* operating a gate 68*d*. In response to the elevated temperature of container 64, the pellets of coating material 67*a* melt in the container 64 to form a pool of liquid coating material indicated by numeral 61. The container 64 may include a dam-like separator 72 between the portion receiving solid coating material and the portion from which liquid coating material is withdrawn.

As shown in FIG. 6, means 52 also includes a sensor 73 to determine the level of liquified coating material in container 64. Sensor 73 is connected with the system control to operate the coating material feed means 67 when the level of the liquified coating material 61 in container 64 becomes too low.

As further shown in FIG. 6, container 64 is formed in part by a manifold 74 which is connected with compressed gas source 62 through a pressure regulator 63b and solenoid-actuated control valve 63a. A controlled flow of gas is provided to means 52 through this connection. The flow of gas is directed through a passageway 75 in the means 52. Passageway 75 is also connected with a conduit 76 that extends from adjacent the bottom of container 64 to a passageway 77 that intersects passageway 75. Passageway 75 extends from its intersection with passageway 77 to an atomizer 78 which is adapted to produce atomized particles of coating material, as indicated at 79a, from the action of the flow of gas therethrough in a manner known in the art. Through the application and flow of gas into means 52 through passageway 75, liquified coating material is drawn through conduit 76 and passageways 77 and 75, is atomized by atomizer 78 and the atomized particles are directed into the upper portion of container 64, as indicated at 79. The smaller micron-sized particles of coating material are carried in a flow of the expanding gas through the particle distributing conduits 55 extending through the bottom of means 52, as indicated at arrow 80, for distribution in the coating zone through the particle emitting orifices 55a.

A preferred coating material of this invention is stearic acid (octadecanoic acid), which has a melting point of about 70° C. or 157° F. Stearic acid can oxidize easily at elevated temperatures and its temperature must be controlled so that it will not be degraded. In the apparatus and method of the invention, stearic acid is liquified, atomized and electrostatically deposited on the exterior surface of glassware containers and forms a tenacious bond to metal oxide coating surfaces of the glassware, it is believed, through the —COOH group of the stearic acid. With the method and apparatus of this invention, one pound of stearic acid, uniformly applied, can provide the effective coating of this invention on as many as one gross of glass containers, such as glass beer bottles, per minute for three shifts, or about 24 hours, and can reduce the need for costly hot end tin oxide coating by one-half.

EXAMPLE I

A coating apparatus as described and shown in FIG. 9 of U.S. Pat. No. 3,989,004 can be used to provide a commercial prior art coating for comparison with the invention. In such coatings, oleic acid can be atomized in an atomizer and conducted into the coating hood, which can be open to atmosphere, and sprayed into contact with heated strips thereby forming a hot oleic acid mist or fog. Circulation of the oleic acid fog is accomplished by a fan operating in the manner shown in FIG. 9 of U.S. Pat. No. 3,989,004.

A first portion of glassware which has received a tin oxide hot end coating can be placed in the coating hood at a temperature somewhat above 200° F. (87° C.) for a period of about 120 seconds. The treatment results in formation of completely transparent coatings on the glassware samples.

The invention can then be used to prepare samples for comparative testing. In the comparative coatings, a coating apparatus as described and shown above, for example in FIGS. 5 and 6, can be used to coat a second portion of the glassware which has received the tin oxide hot end coating. An enclosure can be heated to a temperature of 250° F. (121° C.). Solid state stearic acid can be liquified in a means 52 for providing micron-sized coating material particles in a flow of compressed air. The second portion of the glassware can be placed in the enclosure at about 250° F. (121° C.). A flow of compressed air can be delivered to the atomizer, and the resulting micron-sized particles of liquid stearic acid can be introduced into the enclosure at a rate equal to about one pound of solid stearic acid per day. A charging electrode 57 can be connected with a source of about 50,000 volts d.c. and the bottles can be exposed to resulting charged coating material in the enclosure for a period of 120 seconds.

Samples can be selected at random from the first portion of glassware with the prior art oleic acid coating, and from the second portion of glassware coated in accordance with the invention. The samples with both coatings can be placed in an autoclave, which is provided with steam at 250° F. (121° C.) and 15 pounds per square inch for ten minutes, removed from the autoclave and allowed to cool for testing.

The samples can then be tested for scratch resistance using an industry standard scratch test. Only about 25 pounds of force will result in scratches in the autoclaved samples that have been provided with the prior art oleic acid coating while the scratch resistance of the autoclaved samples coated with the invention will exceed the test force available with the test equipment, that is, with the test equipment applying its maximum force, stearic acid coated samples will remain scratch resistant at forces exceeding 70 pounds.

EXAMPLE II

A third portion of glassware, which can receive a tin oxide coating one-half the weight of the first and second portions of Example I, can be coated with the invention in the same manner as the second portion of Example I, can be placed in the autoclave with the first and second portions of Example I, removed from the autoclave and tested for scratch resistance in the same manner as the first and second portions of Example I. The third portion of glassware with a stearic acid coating in accordance with the invention over a tin oxide hot end coating of one-half the weight of the hot end coatings of the first and second portions will also have a scratch resistance that exceeds the test force available with the test equipment.

Preferred coatings of this invention provide glassware with an unexpectedly effective coating by supplying the glassware to be coated to a coating zone, liquifying stearic acid and atomizing the liquified stearic acid into micron-sized stearic acid particles, presenting the resulting stearic acid particles adjacent the glassware surface to be coated and electrostatically depositing the stearic acid particles on the glassware surface substantially entirely by electrostatic force. The method is preferably performed at a temperature greater than the melting point of the stearic acid but below its degradation temperature, preferably in the range of about 250° F. (121° C.) to about 300° F. (149° C.) and most preferably at about 250° F. (121° C.). The glassware is preferably at a temperature of about 250° F. (121° C.) but may be at a lesser temperature preferably above the melting point of the stearic acid coating material. In the invention it is not necessary that a continuous coating be formed. For good label adherence, it is better to provide a discontinuous coating so that the label glue may penetrate to the glass surface and bond firmly thereto. Notwithstanding the lack of coating continuity, the resultant stearic acid coating is unexpectedly lubricious and durable and provides the other advantages set forth above.

While a stearic acid coating of the invention may be preferable in some applications, the method and apparatus of the invention provide improved coatings substantially entirely on the exterior surface of glassware and can preclude coating material deposition from the interior and mouth portions of glassware containers. Various modifications may be made in the method and apparatus shown and described above without departing from the scope of this invention as defined by the prior art and the claims that follow.

What is claimed is:

1. A method for coating glass containers comprising the steps:
   providing a plurality of glass containers, each having an open top;
   providing at least one coating zone adjacent to a grounded conveyor means;
   providing at least one coating material charging electrode in the coating zone and connecting the charging electrode with a source of high voltage;
   carrying said glass containers, while hot, through the coating zone by said conveyor means in an upright position;
   establishing an electrostatic material charging and depositing field to the exterior surface of the containers in the coating zone;
   providing coating material particles in the coating zone adjacent the containers; and
   electrostatically charging and depositing the coating material particles substantially entirely onto the exterior of said containers.

2. The coating method as in claim 1 wherein the coating material is selected from a group consisting of oleic acid, stearic acid and other fatty acid derivatives.

3. The coating method as in claim 1 wherein the coating material is polyethylene.

4. The method as in claim 1 wherein said glass containers are at a temperature from about 300° to about 400° F.

5. The coating method as in claim 1 wherein the carrying step includes carrying the containers through the coating zone in a plurality of files, and the step of providing coating material particles includes dispersing coating material particles at least one location between the files of containers and generally below their open tops, and the step of establishing an electrostatic charging and depositing field includes locating at least one coating material charging electrode closely adjacent to the at least one location of dispersion of coating material particles, said coating material charging and depositing field being established between the at least one location of dispersion of coating material and the exteriors of the containers generally below their open tops, said coating material being preferentially deposited on portions of the containers generally below their open tops.

6. The coating method as in claim 5 wherein said at least one charging electrode comprises a small plurality of separate needle electrodes surrounding each location of dispersion of coating material.

7. The coating method as in claim 5 wherein said at least one charging electrode comprises a single needle electrode disposed adjacent to each location of dispersion of coating material.

8. The coating method as in claim 5 wherein each charging electrode is connected with the source of high voltage through a high negative resistance.

9. The coating method as in claim 5 wherein said at least one charging electrode is a plurality of single wire electrodes separated by an effective electrostatic separation distance.

10. The method as in claim 1 wherein a quiescent cloud of coating material particles is formed in the coating zone.

11. A method for electrostatically coating the exterior surface of glass containers having open tops, while avoiding the deposition of coating material particles in the interior of said containers, said method comprising the steps of:
   providing a plurality of hot glass containers, each said glass container having an open top;
   providing a coating chamber adjacent to a grounded conveyor;
   providing a particle charging electrode within the coating chamber and connecting the particle charging electrode to a high voltage source;
   providing at least one coating material atomizer operatively coupled to said coating chamber for providing coating material as fine particles;
   maintaining the coating material at a temperature above about 300° F. and below 400° F.;
   transporting the plurality of glass containers, with the grounded conveyor, through the coating chamber;
   introducing the fine coating material particles into the coating chamber; and
   charging the fine coating material particles and electrostatically depositing said fine coating material particles on the exterior portion of the hot containers below their open tops by establishing an electrostatic depositing field between the charged coating material particles and the exterior of said containers.

12. The electrostatic coating method as in claim 11 wherein said particle charging electrode establishes an electrostatic depositing field to the exterior of said containers.

13. Apparatus for providing a protective coating on glassware containers, comprising:
   means forming a coating chamber adapted to receive glassware containers for coating;
   means for providing the coating chamber with micron-sized liquid particles of coating material, comprising a source of compressed gas; a source of liquified coating material, said source of liquified coating material comprising a closed container connected with said source of compressed gas, means for providing solid coating material to said closed container, and means for liquefying said solid coating material within the closed container; and means connected with said source of compressed gas and said source of liquified coating material for forming micron-sized particles of the liquified coating material with a flow of compressed gas for transmission to said coating chamber;

means for maintaining the coating material particles at a temperature above the melting point of the coating material; and means for electrically depositing the micron-sized liquid particles of coating material to the exterior surface of the glassware containers.

14. The apparatus of claim 13 wherein said means for providing said coating material to said closed container comprising a closed feed chamber is adapted to receive a plurality of pellets of solid coating material and connected with said source of compressed gas, and a remotely operated gate and valve and pressure regulator to control the flow of compressed gas to said closed feed chamber to feed solid pellets of coating material as needed.

15. The apparatus of claim 13 further comprising a level sensor within the closed container and extending from the top of the closed container below the desired level of coating material in the closed container and connected to control at least one valve so that coating material may be added to the closed container.

16. A system for coating the lower exterior surface portions of open top glass containers, said coating system comprising:

means for providing a plurality of hot glass containers each having an open top;

means forming a coating zone;

means for carrying said plurality of hot glass containers in an upright position through said coating zone;

means for cooling the open tops of the containers prior to their entry into the coating chamber to further preclude the establishment of an electrostatic depositing field at the open tops of the containers and the deposition of coating material in the interior of the containers;

means disposed within the coating zone for establishing an electrostatic field within the coating zone to the hot glass containers; and means for dispersing coatig material particles within the coating zone for charging and deposition by said electrostatic field establishing means;

said containers carrying means being adapted to cary the containers, while hot, through the coating zone and the charged coating material particles therein, said electrostatic depositing field terminating substantially entirely on the exterior of the containers, whereby coating material is deposited onto the exterior of the containers generally below their open top and the deposition of coating material on the interior of the containers is precluded.

17. A system for coating the lower exterior surface portions of open top glass containers, said coating system comprising:

means for providing a plurality of hot glass containers, each having an open top;

means forming a coating zone;

means for carrying said plurality of hot glass containers by their bases in an unright position through said coating zone;

means disposed within the coating zone for establishing an electrostatic field within the coating zone to the hot glass container; and means for dispersing coating material particles within the coating zone for charging and deposition by said electrostatic field establishing means;

said container carrying means being adapted to carry the containers, while hot, through the coating zone and the charged coating material particles therein, said electrostatic depositing field terminating substantially entirely on the exterior of the containers and generally below their open tops, whereby coating material is deposited onto the exterior of the containers generally below their open tops and the deposition of coating material on the interior of the containers is substantially precluded.

18. The coating system as in claim 17 wherein the coating material is selected from a group consisting of oleic acid, stearic acid and other fatty acid derivations.

19. The coating system as in claim 17 wherein the coating material is polyethylene.

20. The coating system as in claim 17 wherein said field establishing means comprises a plurality of single wire electrodes separated by an effective electrostatic separation distance.

21. The coating system as in claim 17 wherein the hot containers are carried through the coating chamber in a plurality of files by the container carrying means and wherein the fine coating material particles are dispersed at a plurality of locations between the files of containers generally below the open tops thereof;

wherein the field establishing means comprises a plurality of particle charging electrodes, each electrode being located closely adjacent a coating material dispersing means; and wherein an electrostatic depositing field is established between the charging electrodes adjacent the coating material dispersing means and the exterior of the containers generally below their open tops.

22. The coating system as in claim 21 wherein each of the charging electrodes comprises a single needle electrode disposed adjacent each said coating material dispensing means.

23. The coating system as in claim 21 wherein each of the said charging electrodes is connected with the high voltage source through a high resistance.

24. A method for electrostatically coating the exterior surface of glass containers having open tops, while avoiding the deposition of coating material particles in the interior of said containers, said method comprising the steps of:

providing a plurality of hot glass containers, each said glass container having an open top;

providing a coating chamber adjacent to a grounded conveyor;

providing a particle charging electrode within the coating chamber and connecting the particle charging electrode to a high voltage source;

providing at least one coating material atomizer operatively coupled to said coating chamber for providing coating material as fine particles;

maintaining the coating material at a temperature above about 300° F. and below 400° F.;

cooling the upper portions of said containers to inhibit the establishment of an electrostatic field at the open ends of said containers and the deposition of coating material particles in the interiors of the containers;

transporting the plurality of glass containers, with the grounded conveyor, through the coating chamber;

introducing the fine coating material particles into the coating chamber; and charging the fine coating material particles and electrostatically depositing said fine coating material particles on the exterior portion of the hot containers below their open tops by establishing an electrostatic depositing field between the charged coating material particles and the exterior of said containers.

25. The electrostatic coating method as in claim 24 wherein the cooling of the open portions of the containers includes directing a cooling air flow at said upper portions prior to electrostatic deposition of the coating material.

26. A self-contained electrostatic coating apparatus for coating the exterior of a plurality of hot glass containers, comprising:
 a coating material container adapted to provide a reservoir of liquid coating material and a chamber above the reservoir;
 at least one atomizer operatively connected with the reservoir of liquid coating material, said atomizer being adapted to draw liquid coating material from said reservoir with a flow of atomizing air and to atomize the liquid coating material into particles of larger and smaller sizes directed into the chamber of said coating material container above said reservoir, said larger particles being drawn by gravity into said reservoir and said smaller particles being drawn from said container with the flow of atomizing air;
 means to direct the flow of atomizing air and the flow of smaller coating material particles from the coating material container to an outlet orifice formed by the apparatus;
 electrostatic charging means associated with said outlet orifice to charge the flow of coating material particles for electrostatic deposition onto the exterior portions of said glass containers; and
 a supporting structure adapted to provide reciprocation of said apparatus, said reciprocating structure being adapted to move said apparatus with respect to a plurality of hot glass containers to be coated.

27. The apparatus as in claim 26 wherein the apparatus is provided with a heater operatively coupled to the coating material container adapted to maintain a normally solid coating material container at a temperature in excess of its melting point.

28. A system for coating the lower exterior surface portions of open top glass containers, said coating system comprising:
 means for providing a plurality of hot glass containers each having an open top;
 means forming a coating zone;
 means for carrying said plurality of hot glass containers in an upright position through said coating zone;
 means disposed within the coating zone for establishing an electrostatic field within the coating zone to the hot glass containers, said field establishing means comprising a plurality of single wire electrodes separated by an effective electrostatic separation distance; and
 means for dispersing coating material particles within the coating zone in the form of a quiescent cloud for charging and deposition by said electrostatic field establishing means;
 said containers carrying means being adapted to carry the containers, while hot, through the coating zone and the charged coating material particles therein, said particles of single wire electrodes being adapted to be oscillated in the quiescent cloud of coating material particles adjacent the containers to be coated within the coating chamber, said electrostatic depositing field terminating substantially entirely on the exterior of the containers, whereby coating material is deposited onto the exterior of the containers generally below their open top and the deposition of coating material on the interior of the containers is precluded.

29. A method for providing glassware containers with a protective coating, comprising:
 liquifying stearic acid;
 atomizing the liquified stearic acid to form micron-sized liquid particles of stearic acid and presenting the micron-sized liquid particles of stearic acid at the glassware surface for deposition on the glassware surface; and
 electrostatically charging and depositing the micron-sized liquid particles of stearic acid on the exterior surface of the glassware containers.

30. The method of claim 29 wherein the liquified stearic acid is atomized by a flow of air and the micron-sized particles of stearic acid are carried by a flow of the atomizing air for preparation at and electrostatic deposition on the glassware container surface.

31. The method of claim 30 wherein the glassware containers are placed in a heated coating chamber.

32. The method of claim 31 wherein the coating chamber is maintained at a temperature in excess of the melting point of stearic acid but below about 400° F.

33. The method of claim 31 wherein the coating chamber is maintained at a temperature of about 250° F.

34. The method of claim 33 wherein the containers are placed in the coating chamber at a temperature of about 250° F.

35. The method of claim 29 wherein the containers are placed in the coating chamber at temperatures above the melting point of stearic acid.

36. The method of claim 29 wherein the stearic acid is applied at a rate of one pound per day to glassware containers at a rate of one gross per minute.

37. The method of claim 29 wherein the glassware containers have been provided with a hot end coating prior to deposition of the stearic acid.

38. Apparatus for providing a protective coating on glassware containers, comprising means forming a coating chamber adapted to receive glassware containers for coating, means for providing the coating chamber with micron-sized liquid particles of coating material, means for maintaining the coating material particles at a temperature above the melting point of the coating material, and means for electrostatically depositing the micron-sized liquid particles of coating material to the exterior surface of the glassware containers.

39. Apparatus as set forth in claim 38 further comprising further means disposed upstream of said means forming a coating chamber, said further means applying an initial hot end coating to the external surfaces of said glassware containers.

40. The apparatus of claim 38 wherein said means for providing the coating chamber with micron-sized liquid particles of coating material comprises:
 a source of compressed gas;
 a source of liquified coating material; and means connected with said source of compressed gas and said source of liquified coating material for forming micron-sized particles of the liquified coating material with a flow of compressed gas for transmission to said coating chamber.

41. The apparatus of claim 40 wherein said source of liquified coating material and said means for forming micron-sized particles are connected to said source of inert gas through remotely controlled valves and pressure regulators, and are connected together at their bottoms by a conduit and a remotely controlled valve.

42. A method for coating glass containers comprising the steps:

providing a plurality of glass containers, each having an open top;

providing at least one coating zone adjacent to a grounded conveyor means;

providing at least one coating material charging electrode in the coating zone and connecting the charging electrode with a source of high voltage;

carrying said glass containers, while hot, through the coating zone by said conveyor means in an upright position;

cooling the open top of the glass containers prior to their entry into the coating zone;

establishing an electrostatic material charging and depositing field to the exterior surface of the containers in the coating zone;

providing coating material particles in the coating zone adjacent the containers; and electrostatically charging and depositing the coating material particles substantially entirely onto the exterior of said containers.

43. A method for coating glass containers comprising the steps:

providing a plurality of glass containers, each having an open top;

providing at least one coating zone adjacent to a grounded conveyor means;

providing at least one coating material charging electrode in the coating zone and connecting the charging electrode with a source of high voltage;

carrying said glass containers, while hot, through the coating zone by said conveyor means in an upright position;

establishing an electrostatic material charging and depositing field to the exterior surface of the containers in the coating zone;

providing a cloud of coating material particles in the coating zone adjacent the containers;

oscillating said charging electrode in the cloud of coating material particles adjacent the container to be coated; and electrostatically charging and depositing the coating material particles substantially entirely onto the exterior of said containers.

* * * * *